United States Patent [19]
Fujita

[11] Patent Number: 5,441,350
[45] Date of Patent: Aug. 15, 1995

[54] STRUCTURE OF A CROSS ROLLER BEARING

[75] Inventor: Ryuji Fujita, Hyogo, Japan

[73] Assignee: Nippon Thomson Co., Ltd., Tokyo, Japan

[21] Appl. No.: 253,911

[22] Filed: Jun. 3, 1994

[30] Foreign Application Priority Data

Apr. 6, 1993 [JP] Japan .................... 5-158066

[51] Int. Cl.⁶ ............................ F16C 19/36
[52] U.S. Cl. .......................... 384/447; 384/619
[58] Field of Search ............ 384/447, 619, 47, 584, 384/585, 560

[56] References Cited
U.S. PATENT DOCUMENTS

| | | | |
|---|---|---|---|
| 4,746,232 | 5/1988 | Gugel | 384/447 |
| 4,961,653 | 10/1990 | Suzuki et al. | 384/619 |
| 4,974,972 | 12/1990 | Boosler et al. | 384/447 |
| 5,026,177 | 6/1991 | Masuda | 384/619 |

FOREIGN PATENT DOCUMENTS 60-95228  6/1985  Japan .

Primary Examiner—Lenard A. Footland
Attorney, Agent, or Firm—Browdy & Neimark

[57] ABSTRACT

The structure of the cross roller bearing does not require fixing bolts, rivets or holders for the divided races and can firmly assemble the divided races together. The cross roller bearing includes the inner race having a raceway groove and an engagement surface on its outer circumferential surface and the outer race that fits over the inner race and has a raceway groove and an engagement surface on its inner circumferential surface. The outer race is divided into two axially divided races. A large number of rollers are installed in a raceway formed between the raceway grooves. The engagement surface of the inner race is formed with recessed portions at axially inner portions, and the engagement surfaces of the divided races of the outer race are formed with raised portions that rotatably fit in the recessed portions. Thus, the divided races are assembled onto the inner race so that they are rotatable but axially locked relative to the inner race.

9 Claims, 5 Drawing Sheets

STRUCTURE OF A CROSS ROLLER BEARING

BACKGROUND OF THE INVENTION

1. Field of the Invention

The present invention relates to a structure of a cross roller bearing which consists of an outer race, an inner race and a large number of rollers trapped between raceway grooves of the outer and inner races.

2. Description of the Prior Art

Conventional cross roller bearings, as shown in FIG. 8, include an inner race 1 having a V-shaped groove 2 formed by inclined raceway surfaces 5; an outer race 4 consisting of two divided races 4a, 4b each of which has an inclined raceway surface 5 to form an inverted V-shaped groove 20; a raceway 13 formed by the V-shaped groove 2 of the inner race 1 and the inverted V-shaped groove 20 of the outer race 4; and rollers 6 as rolling elements guided by retainers 10. In the cross roller bearing, the rollers 6 in the raceway 13 are arranged in such a way that the adjacent rollers cross each other. The cross roller bearing withstands radial loads and two-way axial loads. The rollers 6 are assembled into the raceway 13 between the inner race 1 and the outer race 4 by forming a bolt insertion hole 17 through the divided races 4a, 4b of the outer race 4, placing the rollers 6 between the inner race 1 and one of the divided races 4a, mounting the other divided race 4b in place, and fastening the divided races 4a and 4b with bolts 18 and nuts 19.

Examples of such cross roller bearings include one disclosed in the Japanese Utility Model Laid-Open No. 95228/1985.

Other known examples of the cross roller bearings use embedded bolts and rivets, in place of bolts and nuts, to assemble the divided outer races.

Such cross roller bearings, however, have the following drawbacks. When the cross roller bearing is assembled by dividing the outer race 4 into a pair of races 4a, 4b, placing the rollers 6 between the inner race 1 and one divided race 4a, mounting the other divided race 4b, and fastening the divided races 4a and 4b together, fixing tools such as bolts, nuts and rivets to hold the divided races 4a, 4b immovable are required. It is also necessary to form insertion holes in the outer race 4 through which to insert the fixing tools such as bolts and nuts. This in turn increases the manufacturing cost and the number of parts. It should also be noted that portions where the insertion holes for the fixing tools are formed constitute a wasted space not functioning as a bearing.

In the cross roller bearing whose outer or inner race is divided in two, if the fixing tools for fastening the divided races can be eliminated, there is no need to form the insertion holes for the fixing tools in the divided races. This increases the strength of the divided races and, because additional space is not needed for the insertion holes in the divided races, the size of the divided races can be reduced to that extent, permitting effective use of the space. In other words, to the extent that the insertion holes for the fixing tools are not required, the outer diameter of the outer race can be made smaller when the outer race consists of the divided races. If the outer diameter of the outer race remains the same, it is possible to increase the pitch circle of the rollers as well as the number of rollers. It is also possible to maintain a good balance in strength between the outer and inner races.

SUMMARY OF THE INVENTION

A main object of this invention is to solve the above-mentioned problems and to provide a structure of a cross roller bearing, which includes an inner race and an outer race, the outer race being divided into a pair of divided races, the inner race being formed as an undivided race; which does not require fixing tools, as does the conventional bearing, in fixing the divided races together; and in which the divided races are assembled onto the undivided race to be fixed together, thereby reducing the number of parts and the manufacturing cost, obviating the process of drilling holes in the divided races for their fixing, increasing the strength of the divided races, securing a freedom of space from the elimination of drilled holes, increasing the effective contact length between the rollers and the raceway, increasing the load capacity, and strengthening the rigidity of the structure.

A further object of this invention is to provide a structure of a cross roller bearing, which comprises:

an inner race having a raceway groove and an engagement surface formed on an outer circumferential surface thereof, the inner race being formed as an undivided race;

an outer race fitted over the inner race and having a raceway groove and an engagement surface formed on an inner circumferential surface thereof, the outer race comprising two divided races or annular components divided by a plane perpendicular to the center axis; and a number of rollers installed in a raceway formed between the raceway grooves;

wherein the engagement surface of the undivided race is formed with recessed portions at axially inner portions and the engagement surfaces of the divided races are formed with raised portions that fit in the recessed portions.

In this cross roller bearing structure, the recessed portions and the raised portions formed in the engagement surfaces are formed as stepped portions so that the engagement surfaces have different diameters at the axially outer portions from those at the axially inner portions. The recessed portions are annular grooves formed at axially intermediate positions on the engagement surface and the raised portions are annular projections formed at axially intermediate positions on the engagement surface which fit in the annular grooves. Further, sealing members are provided at axially outer portions between the inner race and the outer race to seal gaps at axially outer positions between the engagement surfaces of the inner and outer races.

In this cross roller bearing, either the outer race or the inner race is divided into a pair of divided races and the other is formed as an undivided race. The divided races are assembled onto the undivided race in such a way that the divided races are rotatable and axially locked relative to the undivided race. This construction eliminates the need for fastenings such as bolts and nuts or a holder, which are used to prevent the divided races from becoming separated, thus reducing the number of parts.

Because there is no need to form fastening tool insertion holes in the divided races, the manufacturing cost can be lowered and the strength and rigidity of the divided races increased. To the extent that the insertion holes are eliminated, the bearing's outer diameter can be reduced. When the bearing's outer diameters are equal, this cross roller bearing structure can accommodate a greater number of rollers, resulting in an increased effective contact length between the rollers and the raceway and a greater load capacity.

Another feature of this cross roller bearing structure is that because the gap between the engagement surfaces of the divided races and the engagement surface of the undivided race is formed small and because the outer race and the inner race can be kept out of contact with each other when the bearing is mounted for operation, the rotary torque consumed by the bearing can be minimized.

Further, the recessed portions and the raised portions in this cross roller bearing structure can be formed as stepped portions so that both of the engagement surfaces have different diameters at the axially outer portions from those at the axially inner portions, or they can be formed as annular grooves at axially intermediate positions on the engagement surface and as annular projections that fit into the annular grooves.

When the recessed portions are formed as annular grooves at the axially intermediate positions on the engagement surface and the raised portions as annular projections at the axially intermediate positions of the engagement surfaces which fit in the annular grooves, the gap between the inner race and the outer race is very narrow and bent, producing a kind of labyrinth effect, which makes leakage of lubricating oil or agent difficult and thereby improves the sealing performance of the gap between the outer race and the inner race.

The provision of sealing members at the axially outer portions of the engagement surfaces of the inner and outer races can not only prevent leakage of lubricating oil in the raceway but also block the ingress of foreign matters or harmful substances into the raceway. This cross roller bearing therefore can maintain a good working condition for a long period of time.

In this cross roller bearing structure, the engagement surface of the undivided race is formed with the recessed portions at the axially inner portions, the engagement surfaces of the divided races are formed with the raised portions that fit in the recessed portions, and the divided races are press fitted onto the undivided race in such a way that the outer race is rotatable relative to the inner race but axially locked. The assembly procedure is very simple and the engagement of the raised portions with the recessed portions causes the divided races to be securely fixed to the undivided race. The recessed portions in the undivided race and the raised portions in the divided races can be formed simply by differentiating the diameters of different portions of the engagement surfaces, i.e., the inner circumferential surfaces of the outer race and the outer circumferential surface of the inner race.

This cross roller bearing structure can be fabricated by forming the recessed portions in the axially inner portions of the engagement surface of the undivided race and the raised portions in the engagement surfaces of the divided races that fit in the recessed portions; thermally expanding only the outer race to enlarge the diameter of the engagement surface of the outer race; fitting over the inner race the heated outer race with its enlarged inner diameter; and restoring the outer race back to normal state. With these steps taken, the outer race can be assembled onto the inner race in such a way as to be rotatable relative to the inner race and axially locked. In this way, the assembly of the outer race and the inner race can be done very easily.

The cross roller bearing structure may alternatively be fabricated by forming a notched groove in the axially outer portion of the divided races; forming an axially extending bulged portion in the axially outer portion of the undivided race; and locally heating the bulged portion at the axially outer portion of the undivided race, and plastically deforming and embedding it into the notched groove so that the outer race is mounted rotatable on the inner race but axially locked. In this way, it is possible to assemble the outer race and the inner race very easily and to securely lock them together in the axial direction. In this case, the local heating of the bulged portion can be achieved by heating the axially outer portion of the undivided raceway with a high-frequency coil.

DETAILED DESCRIPTION OF THE EMBODIMENT

Figure 1:
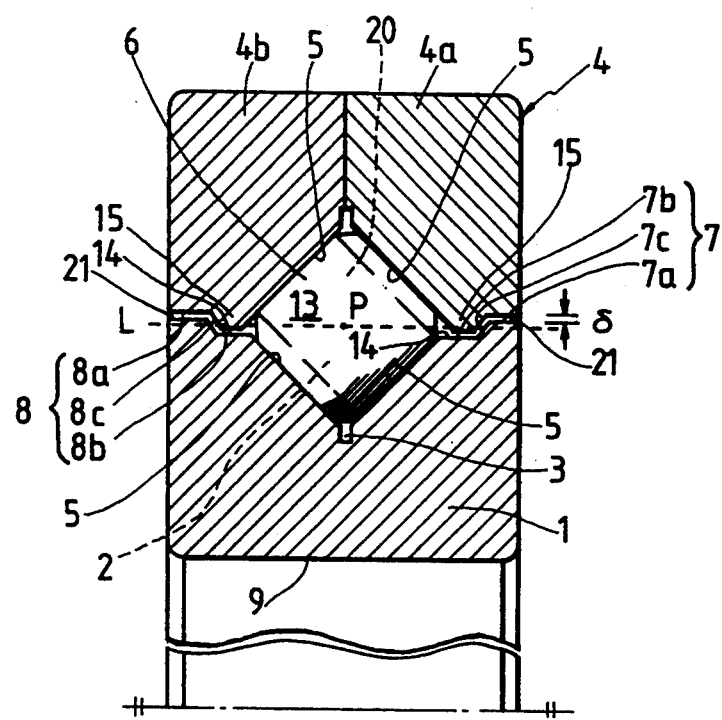
FIG. 1 is a cross section of the cross roller bearing as one embodiment of this invention.

By referring to the accompanying drawings, some embodiments of the cross roller bearing according to the present invention will be described. As shown in FIG. 1, the cross roller bearing has an undivided inner race 1 which has a V-shaped raceway groove 2 formed on its outer circumference and engagement surfaces 7 on both sides of the raceway groove 2; an outer race 4 arranged around and facing the outer circumference of the inner race 1 and which has an inverted V-shaped raceway groove 20 and engagement surfaces 8 formed on its inner surface; and a large number of rollers 6 rolling through a raceway 13 formed between the raceway grooves 2 and 20. The outer race 4 is divided into a pair of annular races 4a, 4b at the center along a plane perpendicular to the central axis. The divided races 4a, 4b each have inclined surfaces 5, 5 at the axially inner portions to form an inverted V-shaped raceway groove 20 that faces and cooperates with the V-shaped raceway groove 2 formed on the outer circumferential surface of the inner race 1 to define a raceway 13. The rolling elements or rollers 6 are incorporated into the raceway 13 so that the adjacent rollers cross each other. In the figure, reference numeral 9 represents the inner diameter of the inner race 1.

In this cross roller bearing, the inner race 1 has a recessed portion 14 at the axially inner portion 7b of the engagement surface 7, and the outer race 4 has a raised portion 15 on the engagement surface 8 that fits into the recessed portion 14. The engagement surface 7 of the inner race 1 consists of an axially outer portion 7a, an axially intermediate portion 7c formed at an inclined stepped portion, and an axially inner portion 7b formed at the recessed portion 14. Likewise, the engagement surfaces 8, 8 of the divided races 4a, 4b of the outer race 4 each consist of an axially outer portion 8a, an axially intermediate portion 8c formed at an inclined stepped portion, and an axially inner portion 8b formed at the raised portion 15. A plane passing through the center P of the rollers 6, i.e., the center plane between the engagement surface 7 of the inner race 1 and the engagement surfaces 8, 8 of the divided races 4a, 4a of the outer race 4 is indicated by a dotted line L. The diameter of the axially outer portions 7a of the engagement surface 7 of the inner race 1 is set larger than the engagement center plane L, while the diameter of the axially inner portions 8b of the engagement surfaces 8 of the divided outer races 4a, 4b is set smaller than the engagement center plane L. The divided races 4a, 4b have their small-diameter portions or raised portions 15 of the engagement surfaces 8 formed slightly smaller in diameter than the large-diameter portion or the axially outer portion 7a of the engagement surface 7 of the inner race 1. The divided races 4a, 4b are each engaged with the axially outer portions 7a of the inner race 1, so that the large-diameter portions and the small-diameter portions with respect to the engagement center plane L fit to each other, holding each other immovable in the axial direction.

In this cross roller bearing, an interference fit of about several tens of μm is provided between the large-diameter portions or the axially outer portions 7a of the inner race 1 and the small-diameter portions or the axially inner portions 8b of the divided outer races 4a, 4b. Between the engagement surface 7 on the outer circumferential surface of the inner race 1 and the engagement surface 8 on the inner circumferential surface of the outer race 4, there is provided a gap 21 of δ=several tens to several hundreds of μm. This cross roller bearing can use separators 16 to hold the rollers 6 spaced from each other. The provision of the separators 16 between the rollers 6 can increase the effective contact length of the rollers, raising the load capacity of the cross roller bearing. Further, an annular groove formed at the bottom of the raceway groove 2 not only forms an escape 3 in cutting the roller traveling surface on the raceway 13 but also constitutes a supply passage for lubricating oil or grease. The gap 21 between the inner race 1 and the outer race 4 is provided with a combination of very fine projections and recesses so as to produce a kind of labyrinth sealing effect, limiting the leakage of the lubricating oil to a very small mount.

Next, the method of fabricating the cross roller bearing according to this invention will be described by referring to FIG. 1. The manufacture of this cross roller bearing involves the steps of forming the raceway groove 2 and the engagement surface 7 on the outer circumferential surface of the inner race 1, axially dividing the outer race 4 into a pair of divided races 4a, 4b, and forming the raceway groove 20 and the engagement surface 8 on the inner circumferential surfaces of the divided races 4a, 4b. The engagement surface 7 of the inner race 1 is formed with recessed portions 14 at the axially inner portion, and the engagement surfaces 8 of the divided races 4a, 4b of the outer race 4 are formed with raised portions 15 that fit into the recessed portions 14. To assemble the divided outer races 4a, 4b onto the inner race 1, the following steps are taken. One of the divided outer races 4a is first elastically deformed under pressure to be press fitted onto the inner race 1. Then, the divided race 4a is moved axially to one side of the inner race 1 until the raised portion 15 of the divided race 4a is aligned with the recessed portion 14 of the inner race 1, to form a half of the raceway 13 with the raceway groove 2 of the inner race 1 and the raceway surface 5 of the divided race 4a. Then, the rollers 6 are loaded into the half-formed raceway 13. At this time, the rollers 6 are assembled so that the axes of the adjacent rollers 6 cross each other.

Next, with the rollers 6 trapped in the raceway 13 defined by the inner race 1 and one of the divided races 4a, the other divided race 4b of the outer race 4 is elastically deformed under pressure to be press fitted onto the inner race 1 until the raised portion 15 of the second divided race 4b engages in the recessed portion 14 of the inner race 1. By this assembly process, the divided races 4a, 4b of the outer race 4 can be assembled onto the inner race 1 in such a way that the they are axially locked while being rotatable relative to the inner race 1. The rollers 6 are installed in the raceway 13 so that the roller axes are alternately arranged in two right-angle directions.

Another method for manufacturing this cross roller bearing is described by referring to FIG. 1. Rather than press fitting the divided races 4a, 4b of the outer race 4 onto the inner race 1, as is done in the preceding embodiment, this embodiment thermally expands the divided outer races 4a, 4b to increase their inner diameters and fits them to the inner races 1. In the cross roller bearing assembled in this way, the outer race 4 fitted onto the inner race 1 is axially locked but rotatable relative to the inner race 1. The rollers 6 are installed in the raceway 13 so that their axes are alternately arranged in two right-angle directions. It is also possible to combine the thermal expansion of the divided outer races 4a, 4b with the contraction of the inner race 1 by cooling with dry ice in fitting the divided outer races 4a, 4b onto the inner race 1.

Figure 2:
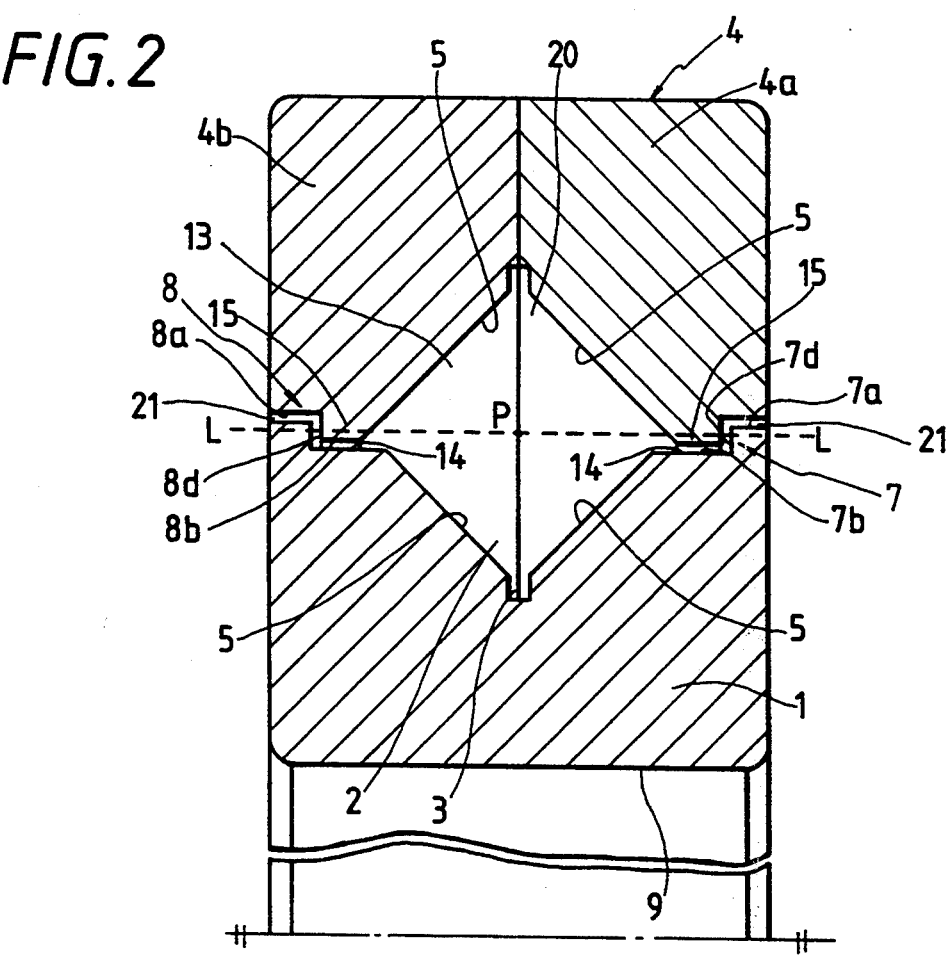
FIG. 2 is a cross section of the cross roller bearing as another embodiment of this invention.

Next, by referring to FIG. 2, still another embodiment of the cross roller bearing Will be described. While in the cross roller bearing shown in FIG. 3 the axially intermediate portions of the engagement surfaces 7 and 8 of the inner race 1 and the outer race 4 are formed inclined, the cross roller bearing of this embodiment, as shown in FIG. 2, has the axially intermediate, stepped portions of the engagement surface 7 of the inner race 1 formed as vertical surfaces 7d perpendicular to the engagement surface 7, and also the axially intermediate, stepped portions of the engagement surfaces 8 of the divided outer races 4a, 4b of the outer race 2 formed as vertical surfaces 8d perpendicular to the engagement surfaces 8. This cross roller bearing has virtually the same function as the bearing shown in FIG. 1 and also the similar manufacturing method. Hence, their explanations are omitted here.

Figure 3:
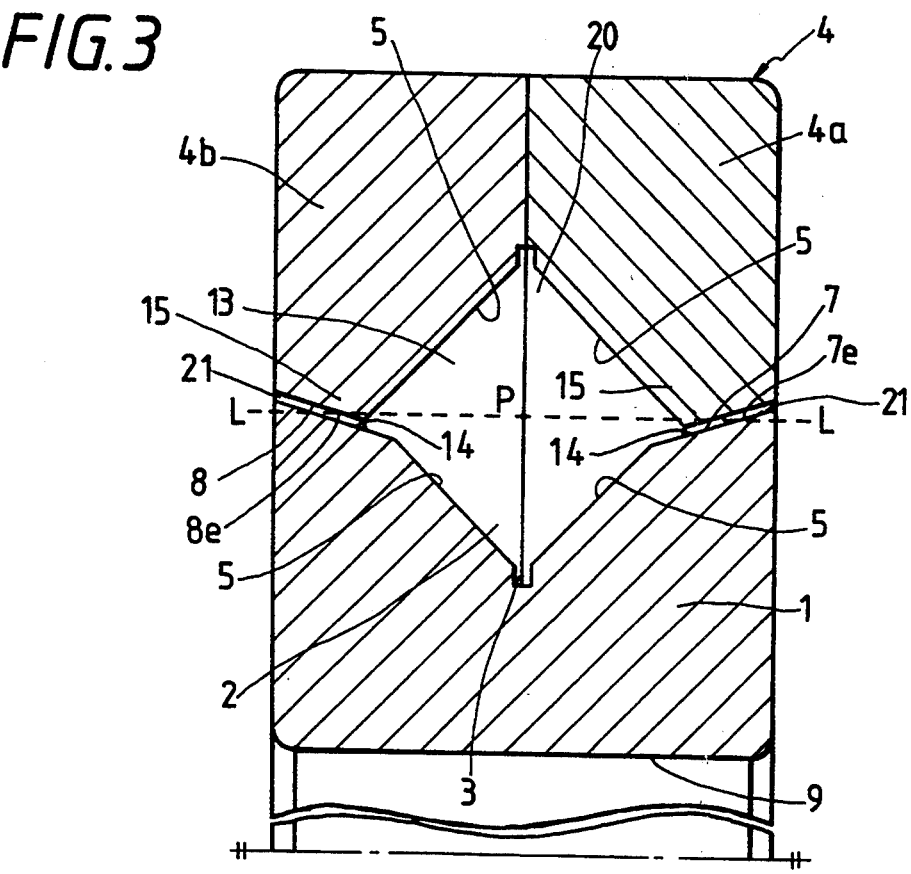
FIG. 3 is a cross section of the cross roller bearing as a further embodiment of this invention.

A further embodiment of the cross roller bearing will be described by referring to FIG. 3. In this embodiment, the engagement surface 7 of the inner race 1 and the engagement surfaces 8 of the divided races 4a, 4b of the outer race 4 are tapered as indicated at 7e, 8e so that the axially inner portions are smaller in diameter than the axially outer portions. Therefore, the engagement surface 7 of the inner race 1 is formed with inclined recessed portions 14 at the axially inner portions, while the engagement surfaces 8 of the divided outer races 4a, 4b are formed with inclined raised portions 15 at the axially inner portions. This cross roller bearing has virtually the same function and manufacturing method as the bearing shown in FIG. 1. Hence, their explanations are omitted here.

Figure 4:
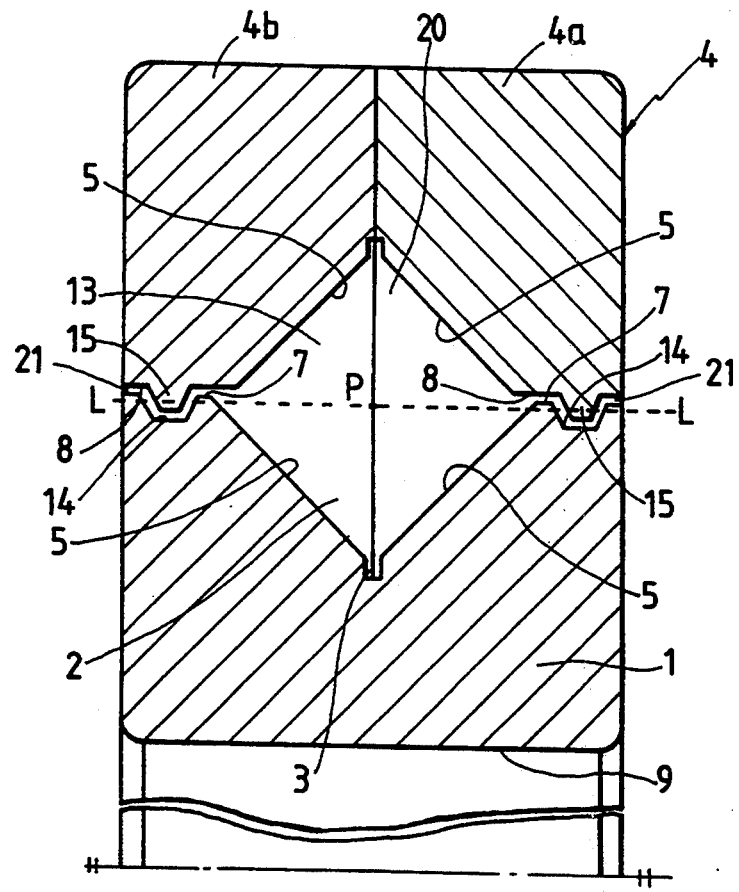
FIG. 4 is a cross section of the cross roller bearing as a further embodiment of this invention.

A further embodiment of the cross roller bearing will be described by referring to FIG. 4. In this cross roller bearing, the recessed portions 14 formed in the engagement surface 7 of the inner race 1 are annular grooves formed at axially intermediate positions on the engagement surface 7; and the raised portions 15 formed on the engagement surfaces 8 are annular projections formed at axially intermediate positions on the engagement surfaces 8 and fitted into the annular grooves. The cross roller bearing of this embodiment has a bent gap 21 between the engagement surface 7 of the inner race 1 and the engagement surfaces 8 of the divided races 4a, 4b, defined by the annular grooves and the annular projections. The bent gap 21 is expected to produce a kind of labyrinth effect, improving a sealing performance. The recessed portions 14 also serve as a stopper for the raised portions 15 in the axially inward direction. This cross roller bearing has virtually the same function and manufacturing method as the bearing shown in FIG. 1. Hence, their explanations are omitted here.

Figure 5:
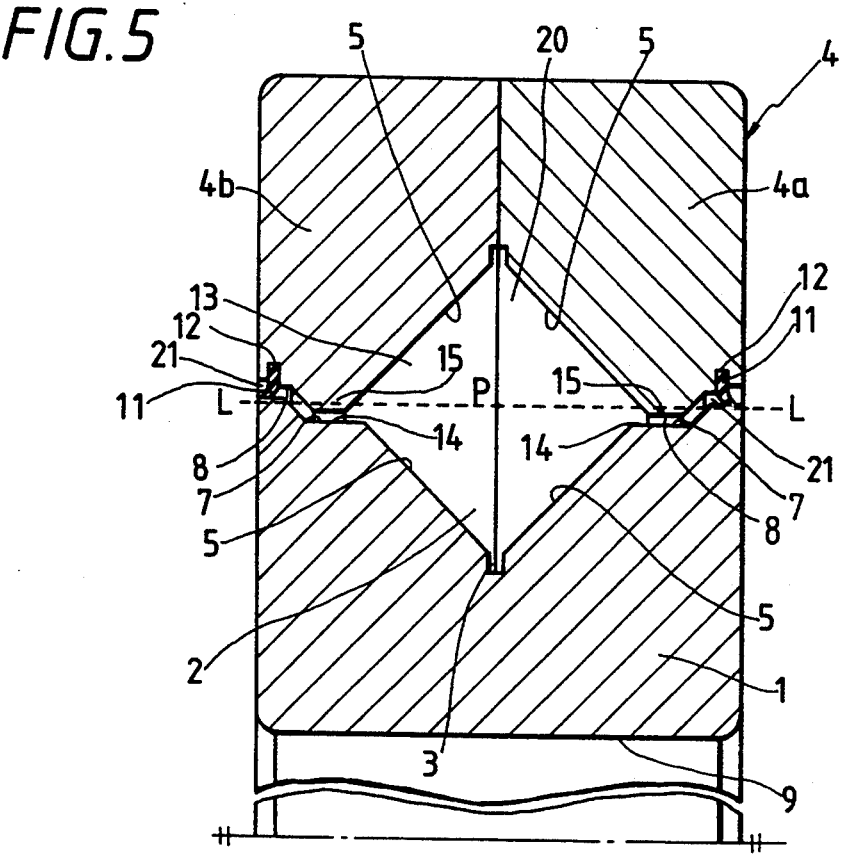
FIG. 5 is a cross section of the cross roller bearing as a further embodiment of this invention.

Next, by referring to FIG. 5, still another embodiment of the cross roller bearing will be explained. In this cross roller bearing a gap 21 of about several hundred $\mu$m is formed between the engagement surface 7 of the inner race 1 and the engagement surfaces 8 of the outer race 4. To seal the gap at the axially external positions between the engagement surface 7 of the inner race 1 and the engagement surfaces 8 of the outer race 4, sealing members 11 are provided at the axially outer portions between the inner race 1 and the outer race 4. The engagement surfaces 8 of the divided outer races 4a, 4b are formed with annular grooves 12 at the axially outer portions, into which annular sealing members 11 formed of rubber are fitted so that they can engage the engagement surface 7 of the inner race 1. Although the gap 21 between the engagement surface 7 of the inner race 1 and the engagement surfaces 8 of the outer race 4 is small, between several tens and several hundreds of $\mu$m, and is also bent, so that the leakage of lubricating oil is very small, the provision of the sealing members 11 as mentioned above will further improve the sealing performance. While in FIG. 5 the annular grooves 12 into which the sealing members 11 are fitted are formed in the divided outer rings 4a, 4b, they may instead be formed in the inner race 1. Though not shown, it is also possible to interpose a sealing member between the contact surfaces of the divided races 4a, 4b.

Figure 6:
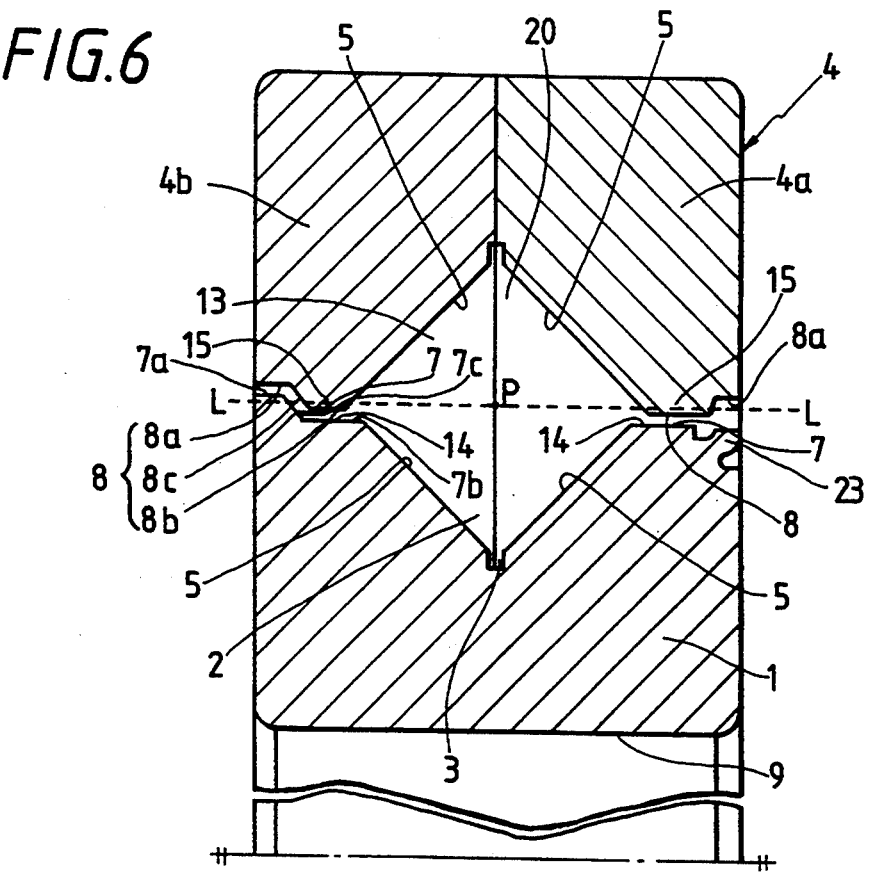
FIG. 6 is a cross section showing one of the divided outer races in the process of being mounted onto the inner race to manufacture the cross roller bearing.
Figure 7:
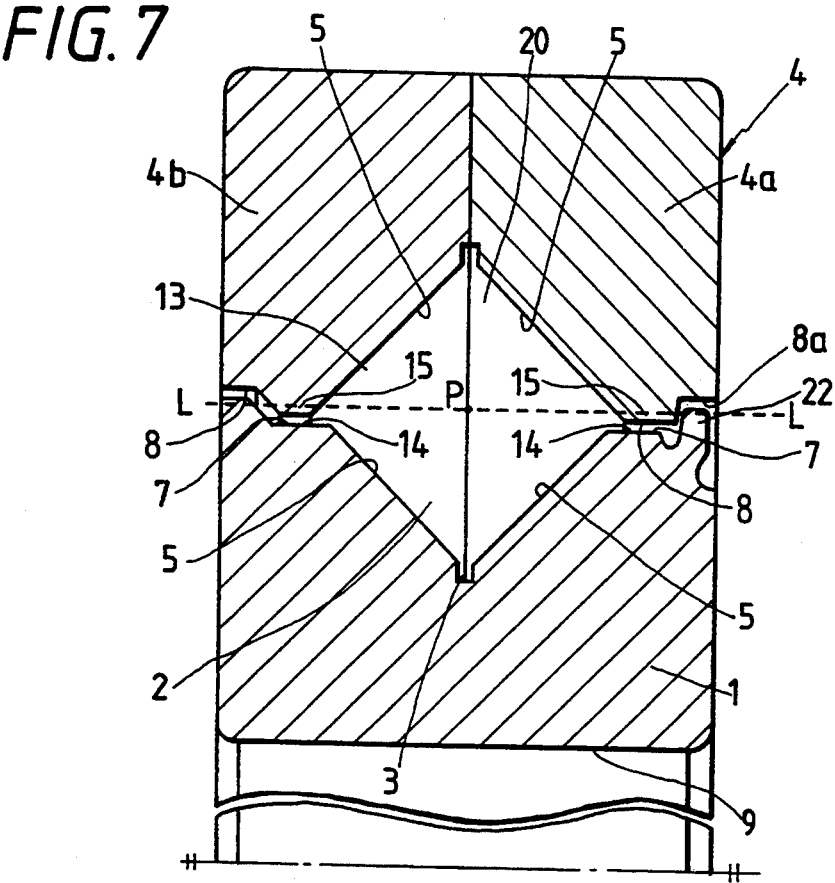
FIG. 7 is a cross section showing one of the divided outer races assembled onto the inner race during the cross roller bearing manufacturing process of FIG. 6.
Figure 8:
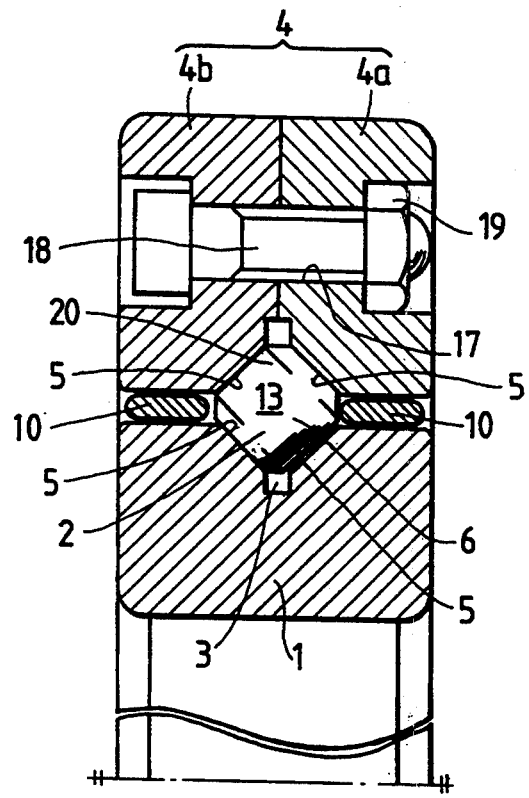
FIG. 8 is a cross section showing an example of the conventional cross roller bearing.
Figure 9:
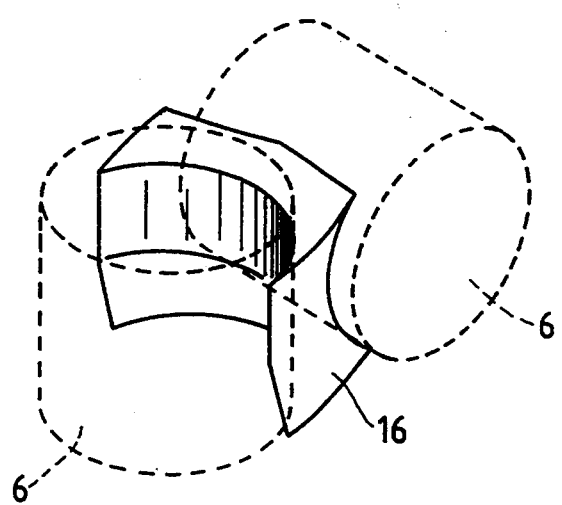
FIG. 9 is a schematic view showing a separator holding rollers spaced from each other.

Another method of manufacturing the cross roller bearing is described by referring to FIG. 6 and 7. The cross roller bearing fabrication method of this embodiment is virtually similar to the preceding embodiment, except that the inner race 1 is locally heated to be plastically deformed so as to allow the divided race 4a of the outer race 4 to be fitted onto the inner race 1. As to the fixing of one divided outer race 4b onto the inner race 1, although the inner race 1 may be locally heated for plastic deformation to fit the divided outer race 4b to the inner race 1, it is also possible to form one of the axially outer portions 7a of the inner race 1 into the shapes of the preceding embodiments, as shown in FIG. 6.

The manufacture of the cross roller bearing according this embodiment involves the steps of forming the raceway groove 2 and the engagement surface 7 on the outer circumferential surface of the inner race 1; dividing the outer race 4 into a pair of races 4a, 4b along a plane perpendicular to the center axis; and forming the raceway groove 20 and the engagement surfaces 8 on the inner circumferential surfaces of the divided races 4a, 4b. One of the engagement surfaces 7 of the inner race 1 (the left one in FIG. 6) is formed with the recessed portion 14 at the axially inner portion 7b, the engagement surface 8 of the divided outer race 4b is formed with the raised portion 15, and the raised portion 15 is fitted into the recessed portion 14 of the inner race 1. The raised portion 15, which is formed on the engagement surface 8 of the divided outer race 4a at the axially inner portion 8b, is fabricated by forming a notched groove at the axially outer portion 8a of the divided outer race 4a and forming an axially extending bulged portion 23 at one of the axially outer portions 7a of the inner race 1.

In the process of fabricating this cross roller bearing, the assembling of the divided races 4a, 4b of the outer race 4 onto the inner race 1 involves fitting one of the divided outer races 4b over the inner race 1 on the side where the divided race 4a is supposed to be situated; moving the divided race 4b to one axial side of the inner race 1; aligning the raised portion 15 of the divided race 4b with the recessed portion 14 of the inner race 1; and forming a half of the raceway 13 with the raceway groove 2 of the inner race 1 and the raceway surface 5 of the divided race 4b. This is followed by installing a large number of rollers 6 into the half-completed raceway 13. At this time, the rollers 6 are installed so that their axes are directed alternately in two right-angle directions. Next, the divided outer race 4a is fitted over the inner race 1; the bulged portion 23 at the axially outer portion 7a of the inner race 1 is locally heated by a high-frequency coil for plastic deformation; and the bulged portion 23 is deformed and moved into the space of the notched groove formed in the divided race 4a of the outer race 4, thus forming an engagement projection 22 at the axially outer portion 7a. With these steps taken, the divided outer race 4a is axially locked but rotatable relative to the inner race 1. The cross roller bearing assembled in this procedure has virtually the same function as the bearing shown in FIG. 1, and thus its explanation is omitted here.

While in the above embodiments, the cross roller bearings all have the inner race 1 undivided and the outer race 4 divided into two outer races 4a, 4b, the configuration is not limited to this one and the reverse configuration may be possible. That is, though not shown, the outer race may be formed undivided and the inner race divided to provide the same effect. In this case, the structures of the inner race and the outer race are simply reversed, so this construction has virtually the same function and manufacturing process as the preceding cross roller bearings. Thus, their explanations are omitted.

I claim:

1. A structure of a cross roller bearing comprising:
an inner race having a first raceway groove and a first engagement surface formed on an outer circumferential surface thereof, the inner race comprising an undivided race;
an outer race fitted over the inner race and having a second raceway groove and a second engagement surface formed on an inner circumferential surface thereof, the outer race comprising two divided races or annular components divided by a plane perpendicular to the center axis; and rollers installed in a raceway formed between the first raceway groove and the second raceway groove;

wherein the first engagement surface of the undivided race is formed with recessed portions at axially inner portions and the second engagement surface of the divided races is formed with raised portions that rotatably fit in the recessed portions.

2. A structure of a cross roller bearing according to claim 1, wherein only the outer race is thermally expanded and fitted over the inner race in such a way that the outer race is axially locked but rotatable relative to the inner race.

3. A structure of a cross roller bearing according to claim 1, wherein the recessed portions and the raised portions are formed as stepped portions so that axially outer portions and axially inner portions of the inner race and the outer race have differing diameters.

4. A structure of a cross roller bearing according to claim 3, wherein the divided races are press fitted onto the undivided race in such way that the outer race is axially locked but rotatable relative to the inner race.

5. A structure of a cross roller bearing according to claim 3, wherein only the outer race is thermally expanded and fitted over the inner race in such a way that the outer race is axially locked but rotatable relative to the inner race.

6. A structure of a cross loller bearing according to claim 1, wherein the recessed portions are annular grooves formed at axially intermediate positions on the first engagement surface and the raised portions are annular projections formed at axially intermediate positions on the second engagement surface that fit in the annular grooves.

7. A structure of a cross roller bearing according to claim 6, wherein the divided races are press fitted onto the undivided race in such way that the outer race is axially locked but rotatable relative to the inner race.

8. A structure of a cross roller bearing according to claim 6, wherein only the outer race is thermally expanded and fitted over the inner race in such a way that the outer race is axially locked but rotatable relative to the inner race.

9. A structure of a cross roller bearing according to claim 1, wherein the divided races are press fitted onto the undivided race in such a way that the outer race is axially locked but rotatable relative to the inner race.

* * * * *